United States Patent Office 2,994,713
Patented Aug. 1, 1961

2,994,713
ALKYLENEBORATOALKYL ACRYLATES AND METHACRYLATES
Constance A. Lane, Philadelphia, Pa., assignor to Rohm & Haas Company, Philadelphia, Pa., a corporation of Delaware
No Drawing. Filed Sept. 3, 1959, Ser. No. 837,789
12 Claims. (Cl. 260—462)

The present invention relates to polymerizable borate ester derivatives of hydroxyalkyl esters of $\alpha,\beta$-ethylenically unsaturated monocarboxylic acids, and more particularly to alkyleneboratoalkyl acrylates and methacrylates, and to a process for preparing same. The novel polymerizable esters of this invention comprise a new class of compounds, which contain as distinct and separate groups within their structure both an ester group derived from an $\alpha,\beta$-ethylenically unsaturated monocarboxylic acid and an ester group derived from boric acid, these groups being attached to the same divalent saturated aliphatic hydrocarbon group.

The new compounds have the general formula:

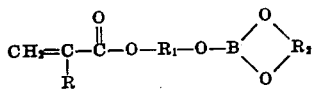

where R is a hydrogen atom or a methyl group, $R_1$ is a straight-chain or branched alkylene group having two to six carbon atoms, and $R_2$ is a divalent hydrocarbon radical derived from a 1,2- or 1,3-glycol containing not over ten carbon atoms.

Typical compounds within the scope of this invention are those represented by the following structural formulas and names:

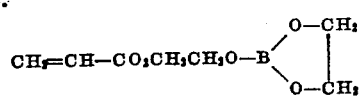
Ethyleneboratoethyl acrylate

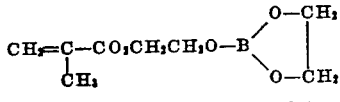
Ethyleneboratoethyl methacrylate

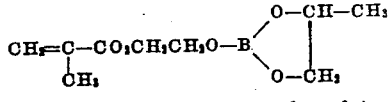
1,2-propyleneboratoethyl methacrylate

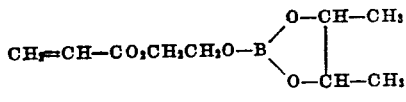
2,3-butyleneboratoethyl acrylate

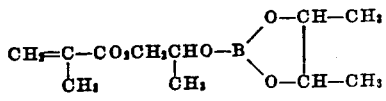
2,3-butyleneboratopropyl methacrylate

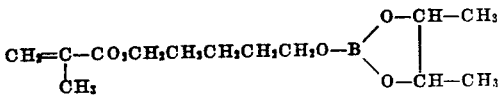
2,3-butyleneboratopentyl methacrylate

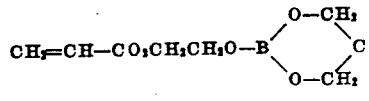
1,3-propyleneboratoethyl acrylate

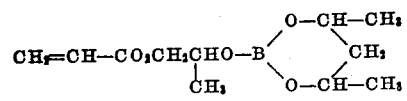
2,4-pentyleneboratopropyl acrylate

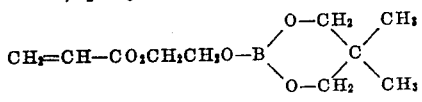
2,2-dimethyl-1,3-propyleneboratoethyl acrylate

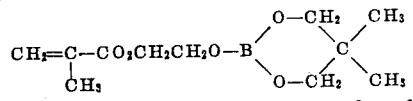
2,2-dimethyl-1,3-propyleneboratoethyl methacrylate

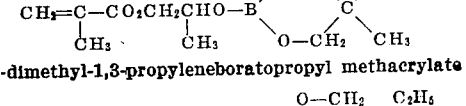
2,2-dimethyl-1,3-propyleneboratopropyl methacrylate

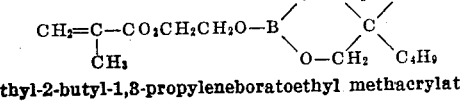
2-ethyl-2-butyl-1,3-propyleneboratoethyl methacrylate

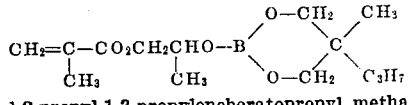
2-methyl-2-propyl-1,3-propyleneboratopropyl methacrylate

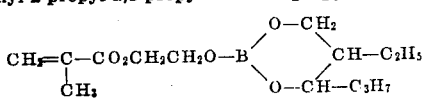
2-ethyl-1,3-hexyleneboratoethyl methacrylate

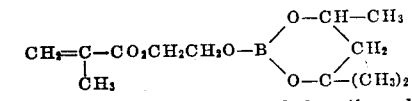
2-methyl-2,4-pentyleneboratoethyl methacrylate

The compounds of this invention are prepared by the reaction of an alkylene hydrogen borate with an hydroxyalkyl ester of an $\alpha,\beta$-ethylenically unsaturated acid, as illustrated by the following general equation:

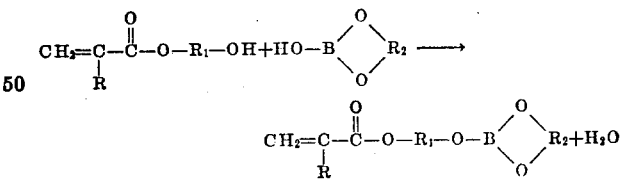

The alkylene hydrogen borate employed in the above procedure is produced by the condensation of one mole of a 1,2- or 1,3-glycol with one mole of boric acid, as shown in the following equation:

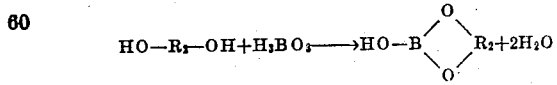

These reactions are conveniently carried out in a solvent such as benzene or toluene which also serves to assist in the azeotropic distillation of water. It is not necessary to isolate the intermediate alkylene hydrogen borate prior to its reaction with an hydroxyalkyl ester of an $\alpha,\beta$-ethylenically unsaturated acid. It has, in fact, been found possible to produce the compounds of this invention by means of a single step reaction between the 1,2- or 1,3-glycol, boric acid and the hydroxyalkyl ester of an α,β-ethylenically unsaturated acid, as illustrated by the following general equation:

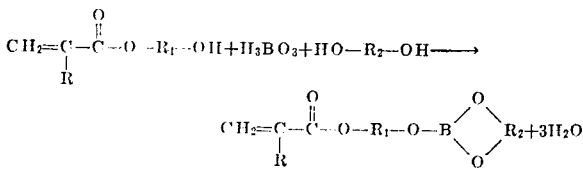

An alternative procedure for the preparation of the compounds of this invention is the transesterification of an alkyl alkyleneborate with an hydroxyalkyl ester of an α,β-ethylenically unsaturated acid. In this procedure, a lower-boiling alcohol such as ethanol or butanol is removed, as illustrated by the following general equation:

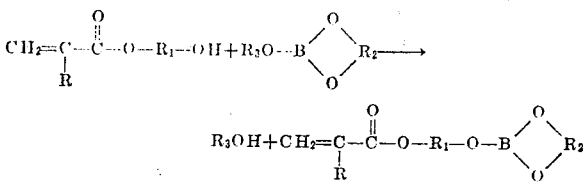

where $R_3$ is an alkyl group of not over six carbon atoms. The alkyl alkylene borate ester employed in this procedure is produced by transesterification of one mole of a 1,2- or 1,3-glycol with one mole of a trialkyl borate in which the alkyl group contains not over six carbon atoms, or by condensation of one mole of the alkylene hydrogen borate with one mole of an alcohol containing not over six carbon atoms.

The hydroxyalkyl esters of α,β-ethylenically unsaturated acids which are used as starting material in accordance with this invention are exemplified by 2-hydroxyethyl acrylate, 2-hydroxyethyl methacrylate, 2-hydroxypropyl methacrylate, 4-hydroxybutyl methacrylate, 5-hydroxypentyl methacrylate and the like.

The glycols which are suitable as starting materials in the practice of this invention include ethylene glycol, propylene glycol, 1,3-propanediol, 1,3-butanediol, 2,3-butanediol, 2,2-dimethyl-1,3-propanediol, 2,4-pentanediol, 2-ethyl-1,3-hexanediol, 2-methyl-2-propyl-1,3-propanediol, 2-ethyl-2-butyl-1,3-propanediol, 2,2-diethyl-1,3-propanediol, 1,1,3-trimethyl-1,3-propanediol and the like.

The compounds of this invention are useful monomers for polymerization and copolymerization with other polymerizable monomers to yield polymers which are useful as plastics and lubricating oil additives.

The following examples further illustrate specific embodiments of this invention:

EXAMPLE 1

*Ethyleneboratoethyl methacrylate*

A mixture of butyl ethylene borate (72 gms., 0.5 mole), 2-hydroxyethyl methacrylate (65 gms., 0.5 mole), anhydrous toluene (480 ml.), and methylene blue (1.0 gm.) was heated under a small column for eight hours. The column was topped with an automatic head equipped with a thermoregulator that was set for a maximum distillation temperature of 109° C. A total of 124 grams of the butanol-toluene azeotrope (B.P. 106° C., theo. 137.5 gms.) was collected. The thermoregulator was finally raised to 115° C. and an additional 40 ml. of distillate collected. Upon cooling, 1.0 gm. of N,N'-di-2-(1,4-naphthoquinonyl)-p-phenylenediamine and 0.2 gm. of hydroquinone were added and the reaction mixture stripped to 60° C./30 mm. Ethyleneboratoethyl methacrylate distilled at 90–100° C./0.01 mm. in 56% yield; found 5.6% B, 47.84% C, 6.72% H; calculated for $C_8H_{13}O_5B$, 5.4% B, 48.04% C, 6.55% H. The mobile liquid distillate immediately reverted to a clear, colorless, viscous product. The infrared spectrum revealed that the double bonds were still present in the viscous product and addition of azodiisobutyronitrile produced a clear, colorless, rigid polymer. Thus, the unsubstituted cyclic ethylene ester appears to revert to the open-chain polymeric ester on standing. Heating in the presence of an inhibitor for vinyl polymerization causes pyrolysis of the open-chain structure and the more volatile cyclic derivative distills.

EXAMPLE 2

*2,3-butyleneboratoethyl methacrylate*

A solution of 124 grams of boric acid, 180 grams of 2,3-butanediol and 400 ml. of dry benzene was heated to reflux with stirring for five hours. Water (76 ml.) was collected in a Dean-Stark tube and the benzene distilled off to a pot temperature of 100° C. 2,3-butylene hydrogen borate, 75% yield, distilled as a clear, viscous syrup at 110–119° C./0.6 mm., 9.4% B (Theo. 9.3% B). Benzene (200 ml.), 2-hydroxyethyl methacrylate (65 gms.), and 0.5 gram of methylene blue were added to 58 grams of 2,3-butylene hydrogen borate and the mixture heated to reflux with stirring. Water (9 ml.) was collected in a Dean-Stark tube over a period of five to six hours. N,N'-di-2-(1,4-naphthoquinonyl)-p-phenylenediamine (1.0 gram) was added and the reaction mixture stripped to 50° C./30 mm. 2,3-butyleneboratoethyl methacrylate (97 grams, 85% yield) distilled at 100–108° C./0.5 mm., $n_D^{25}$ 1.4454, 4.8% B (Theo. 4.74% B). Redistillation gave a clear, colorless liquid, B.P. 88–94° C./0.02 mm., $n_D^{25}$ 1.4451, 4.9% B (Theo. 4.74% B), 52.40% C (Theo. 52.67% C), 7.85% H (Theo. 7.5% H). This product polymerized to colorless glass in the presence of peroxides.

EXAMPLE 3

*2,2-dimethyl-1,3-propyleneboratoethyl methacrylate*

A. A solution of 104 grams of neopentyl glycol and 62 grams of boric acid in 300 ml. of dry benzene was heated to reflux with stirring under a Friedricks condenser and a Dean-Stark tube. Water (36 ml.) was collected over a period of four hours. After adding 1.0 gram of methylene blue and 130 grams of 2-hydroxyethyl methacrylate, another 18 ml. of water was collected during an additional three-hour reflux period. The reaction mixture was then cooled and 2.5 grams of N,N'-di-2-(1,4-naphthoquinonyl)-p-phenylenediamine and 0.2 gram of hydroquinone added. After stripping off the benzene, the product (179 grams, 74% yield) distilled at 100–112° C./0.02 mm., $n_D^{25}$ 1.4507. Redistillation gave pure 2,2-dimethyl-1,3-propyleneboratoethyl methacrylate, B.P. 100–110° C./0.02 mm., $n_D^{25}$ 1.4495, 4.4% B (Theo. 4.46), 54.39% C (Theo. 54.59), 8.15% H (Theo. 7.91). This clear, colorless liquid polymerized to a clear, hard polymer in the presence of added peroxides.

B. A solution of butyl neopentylene borate (56 gms., 0.3 mole), 2-hydroxyethyl methacrylate (39 gms., 0.3 mole), dry toluene (200 ml.) and methylene blue (0.5 gm. was heated under a small column while 82 grams of the butanol-toluene azeotrope distilled at 106° C. After adding 0.7 gram of N,N'-di-2-(1,4-naphthoquinonyl)-p-phenylenediamine and 0.1 gram of hydroquinone, the reaction mixture was stripped to 100° C./20 mm. 2,2-dimethyl-1,3-propyleneboratoethyl methacrylate (49 gms., 68% yield) distilled at 100–112° C./0.03 mm., $n_D^{25}$ 1.4510, 3.9% B (Theo. 4.46% B).

EXAMPLE 4

*2,2-dimethyl-1,3-propyleneboratoethyl acrylate*

A solution of butyl neopentylene borate (56 gms., 0.3 mole), 2-hydroxyethyl acrylate (35 gms., 0.3 mole), dry toluene (200 ml.) and 0.5 gram of methylene blue was heated under a small column in a manner similar to that described in Example 3B. After stripping the reaction mixture to 100° C./20 mm., there was obtained an essentially quantitative yield of a residue which was identified as 2,2-dimethyl-1,3-propyleneboratoethyl acrylate.

EXAMPLE 5

2,3-butyleneboratopropyl methacrylate

From 124 grams of boric acid, 180 grams of 2,3-butanediol and 72 grams of 2-hydroxypropyl methacrylate in a manner similar to that described in Example 2 there was obtained a 73% yield of 2,3-butyleneboratopropyl methacrylate, B.P. 95–102° C./0.15 mm.

The compound 2,2-dimethyl-1,3-propylene-boratopropyl methacrylate can be prepared by reacting hydroxypropyl methacrylate with 2,2-dimethyl-1,3-propylene hydrogen borate.

These products polymerize to clear, colorless glasslike polymers when heated to 60° C. with a small amount of free-radical catalyst, of the peroxide type or of the azo type, for instance, 0.1% of azodiisobutyronitrile. Copolymers with methyl methacrylate yield clear, colorless, hard polymers while copolymers with the higher alkyl methacrylates, such as lauryl methacrylate, yield products which function as dispersants for asphaltenes in lube oils.

I claim:

1. A compound having the general formula

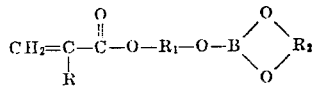

wherein R is a member of the class consisting of hydrogen and methyl, $R_1$ is a member of the class consisting of alkylene groups having two to six carbon atoms, and $R_2$ is a member of the class consisting of divalent hydrocarbon radicals derived from the class consisting of 1,2- and 1,3-glycols containing not over ten carbon atoms.

2. Ethyleneboratoethyl methacrylate.
3. 2,3-butyleneboratoethyl methacrylate.
4. 2,2-dimethyl-1,3-propyleneboratoethyl methacrylate.
5. 2,3-butyleneboratopropyl methacrylate.
6. 2,2 - dimethyl - 1,3 - propyleneboratopropyl methacrylate.

7. A process for preparing a compound of the formula

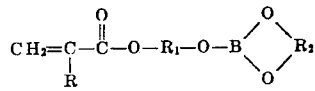

wherein R is a member of the class consisting of hydrogen and methyl, $R_1$ is a member of the class consisting of alkylene groups having two to six carbon atoms, and $R_2$ is a member of the class consisting of divalent hydrocarbon radicals derived from the class consisting of 1,2- and 1,3-glycols containing not over ten carbon atoms which comprises reacting together a compound of the formula

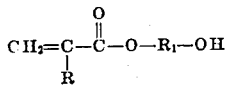

and a compound of the formula

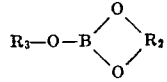

wherein R, $R_1$ and $R_2$ have the above meanings, and $R_3$ is a member of the class consisting of hydrogen and alkyl groups of not over six carbon atoms.

8. A process for preparing ethyleneboratoethyl methacrylate which comprises reacting hydroxyethyl methacrylate with butyl ethylene borate.

9. A process for preparing 2,3-butyleneboratoethyl methacrylate which comprises reacting hydroxyethyl methacrylate with 2,3-butylene hydrogen borate.

10. A process for preparing 2,2-dimethyl-1,3-propyleneboratoethyl methacrylate which comprises reacting hydroxyethyl methacrylate with 2,2-dimethyl-1,3-propylene hydrogen borate.

11. A process for preparing 2,3-butyleneboratopropyl methacrylate which comprises reacting hydroxypropyl methacrylate with 2,3-butylene hydrogen borate.

12. A process for preparing 2,2-dimethyl-1,3-propyleneboratopropyl methacrylate which comprises reacting hydroxypropyl methacrylate with 2,2-dimethyl-1,3-propylene hydrogen borate.

No references cited.